(12) United States Patent
Ikeda

(10) Patent No.: US 7,802,899 B2
(45) Date of Patent: Sep. 28, 2010

(54) ROD-SHAPED LIGHT GUIDE AND IMAGE READING DEVICE

(75) Inventor: Makoto Ikeda, Minato-ku (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 39 days.

(21) Appl. No.: 12/257,877

(22) Filed: Oct. 24, 2008

(65) Prior Publication Data
US 2009/0303732 A1 Dec. 10, 2009

(30) Foreign Application Priority Data
Jun. 10, 2008 (JP) ............................. 2008-151783

(51) Int. Cl.
*F21S 4/00* (2006.01)
(52) U.S. Cl. ........................ 362/223; 362/555; 385/146; 358/484
(58) Field of Classification Search ................. 362/223, 362/231, 255, 551, 552, 555, 558, 600, 609, 362/610, 613, 615, 617, 625, 634, 800; 385/146, 385/147, 901; 358/484, 509
See application file for complete search history.

(56) References Cited

U.S. PATENT DOCUMENTS

| 6,357,903 | B1 * | 3/2002 | Furusawa et al. | 362/555 |
| 6,902,309 | B2 * | 6/2005 | Uemura et al. | 362/555 |
| 7,076,148 | B2 * | 7/2006 | Nemoto et al. | 385/147 |
| 7,125,151 | B2 * | 10/2006 | Uemura et al. | 362/602 |
| 7,209,268 | B2 * | 4/2007 | Ikeda | 358/475 |
| 7,308,187 | B2 * | 12/2007 | Saito et al. | 385/147 |
| 7,555,194 | B2 * | 6/2009 | Ikeda et al. | 385/146 |
| 2009/0003016 | A1 * | 1/2009 | Ishimaru et al. | 362/617 |

FOREIGN PATENT DOCUMENTS

JP 2006-148501 A 6/2006

* cited by examiner

*Primary Examiner*—Hargobind S Sawhney
(74) *Attorney, Agent, or Firm*—Sughrue Mion, PLLC

(57) ABSTRACT

A rod-shaped light guide includes an end face to which light is incident, a bottom plane on which a scattering pattern to scatter light incident to the end face is formed, and a light emitting portion located to be opposite to the bottom plane and emitting light outside. The light emitting portion is formed as a first plane and a second plane connected to each other. The first plane is formed to be smaller than the second plane so that the cross section thereof perpendicular to the longitudinal direction is asymmetrical.

5 Claims, 6 Drawing Sheets

SUB-SCANNING DIRECTION

SUB-SCANNING DIRECTION

SUB-SCANNING DIRECTION

ROD-SHAPED LIGHT GUIDE AND IMAGE READING DEVICE

BACKGROUND OF THE INVENTION

1. Field of the Invention

The present invention relates to a rod-shaped light guide operative to receive light at an end face and emit light at a predetermined emitting portion, and to an image reading device having a rod-shaped light guide built therein.

2. Description of the Related Art

Facsimile machines, copiers, and scanners have a built-in image reading device provided with a rod-shaped light guide for illuminating a document with a line light and with a lens array for condensing light reflected from the document onto a line image sensor.

In such an image reading device, a document may be placed on a glass plate such that a portion of the document is elevated. In order to read from the elevated portion of the document (hereinafter, referred to as elevated portion), the elevated portion needs to be illuminated with sufficient brightness. Variation in light intensity occurring when the document is elevated is represented as depth of illumination. Patent document No. 1 discloses a technology whereby a deflecting means, for bringing the optimum light intensity distribution close to the optical axis of the lens array by shifting light intensity distribution of the emitted light in the sub-scanning direction, is provided in a light emitting portion of a rod-shaped light guide in order to achieve sufficient light intensity and obtain proper depth of illumination. [patent document No. 1] JP 2006-148501

However, while the technology disclosed in patent document 1 is capable of increasing light intensity at a desired position, there is still room for improvement in depth of illumination.

SUMMARY OF THE INVENTION

In this background, a general purpose of the present invention is to provide a rod-shaped light guide capable of achieving high light intensity and providing proper depth of illumination, and to provide an image reading device using the rod-shaped light guide.

The rod-shaped light guide according to at least one embodiment of the present invention comprises: an end face to which light is incident; a scattering pattern formation plane operative to scatter light incident to the end face; and a light emitting portion located to be opposite to the scattering pattern formation plane and emitting light outside, wherein the light emitting portion is formed as a plurality of planes connected to each other, and the cross section of the portion perpendicular to the longitudinal direction is asymmetrical. The light emitting portion may be formed such that a first plane located at one end in the lateral direction is smaller than a second plane located at the other end.

High light intensity and proper depth of illumination are incompatible with each other. However, in the rod-shaped light guide according to the embodiment, the characteristic of illumination by a given plane can complement that of another so that high light intensity and proper depth of illumination can both be achieved.

The light emitting portion may be formed as the first plane and the second plane connected to each other. The light emitting portion may be formed such that the interior angle formed by the first plane and the second plane is between 90° and 120°. The light emitting portion may be formed such that the acute angle formed by the bisector of the interior angle formed by the first plane and the second plane and the line normal to the scattering pattern formation plane is between 10° and 20°.

Another embodiment of the present invention relates to an image reading device. The image reading device comprises: the aforementioned rod-shaped light guide for illuminating a document with light; a lens array operative to condense the light emitted by the rod-shaped light guide and reflected by the document; and a line image sensor operative to receive the light condensed by the lens array, wherein the rod-shaped light guide is fitted such that the first plane is located to face the document and the second plane is located to face the line image sensor.

According to the embodiment, an image forming device can be configured such that high light intensity and proper depth of illumination are both achieved.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

A description will now be given of the best mode of practicing the present invention with reference to the accompanying drawings.

Figure 1:
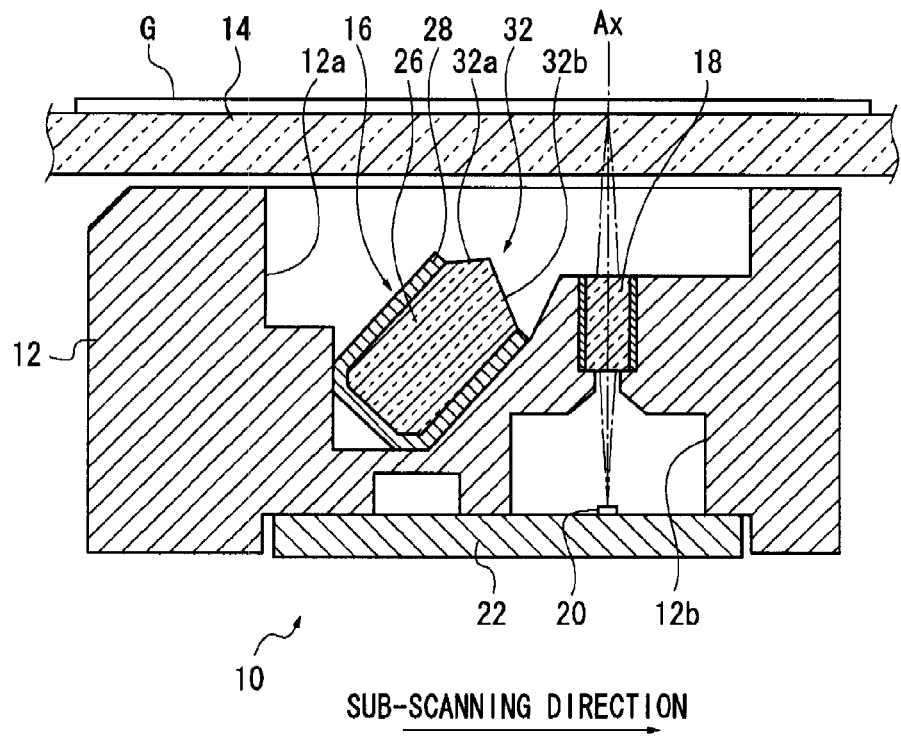
FIG. 1 is a sectional view of an image reading device according to an embodiment of the present invention.

FIG. 1 is a sectional view of an image reading device 10 according to an embodiment of the present invention. As shown in FIG. 1, the image reading device 10 comprises a frame (housing) 12, a glass plate 14 for placing a document G, a line illuminator 16 for illuminating the document G with light, a rod lens array 18 for condensing light from the document G, and a line image sensor (photoelectric transducer) 20 for receiving light condensed by the rod lens array 18.

A recess 12a is formed in the upper part of the frame 12 and a recess 12b is formed in the lower part. The line illuminator 16 is diagonally fixed inside the recess 12a. The line illuminator 16 is fixed such that the optical axis of the illuminating light passes through the intersection between the optical axis Ax of the rod lens array 18 and the top surface of the glass plate 14. The top of the recess 12a is covered by the glass plate 14. A substrate 22 provided with the line image sensor 20 is fitted in the recess 12b in the lower part. The rod lens array 18 is secured between the recess 12a and the recess 12b of the frame 12.

In the image reading device 10, the document G is irradiated by the light emitted by the line illuminator 16 via the glass plate 14 and the light reflected by the document G is detected by the line image sensor 20 via the rod lens array 18 so that the document G is read accordingly. By scanning the frame 12 in the sub-scanning direction with respect to the glass plate 14, desired areas of the document G can be read.

Figure 2:
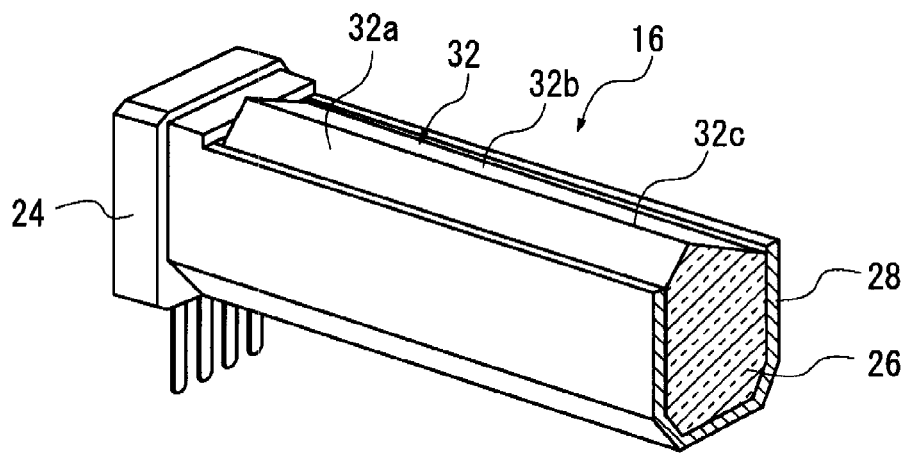
FIG. 2 is a perspective view of a line illuminator.
Figure 3:
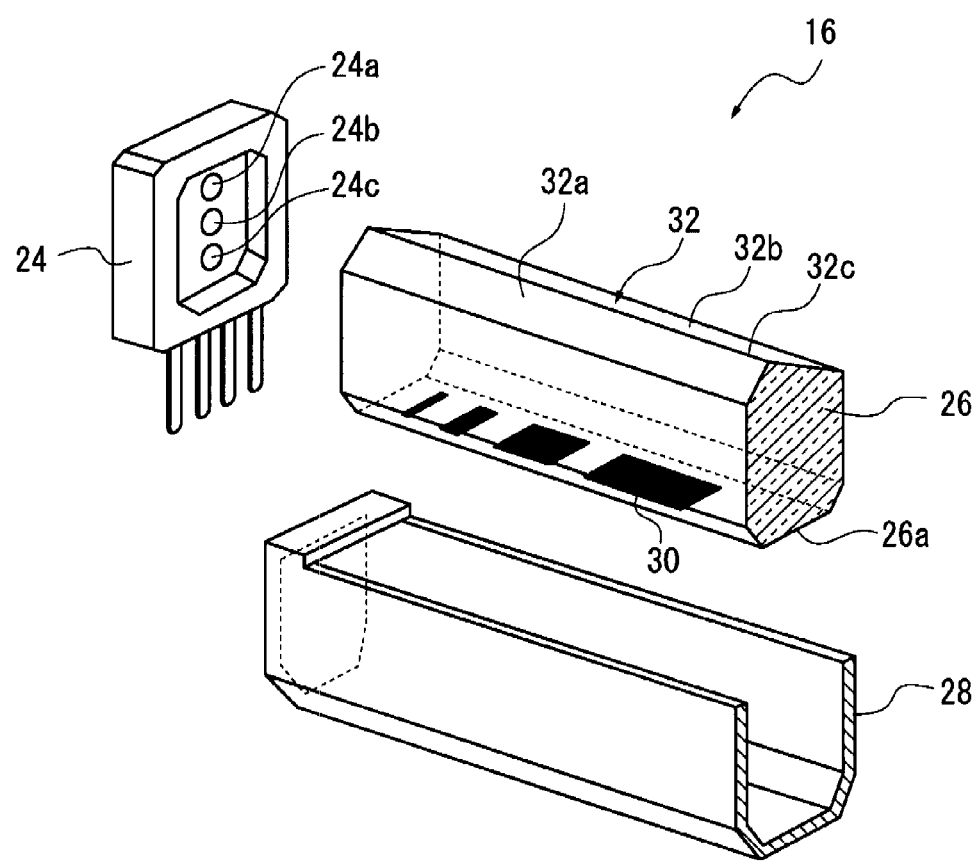
FIG. 3 is an exploded perspective view of the line illuminator.

FIG. 2 is a perspective view of the line illuminator 16. FIG. 3 is an exploded perspective view of the line illuminator 16. As shown in FIGS. 2 and 3, the line illuminator 16 is configured such that a rod-shaped light guide 26 is loaded in a white light guide case 28, and a light-emitting unit 24 is provided at one end of the illuminator.

As shown in FIG. 3, the light-emitting unit 24 is provided with three light-emitting elements (LED) 24a, 24b, and 24c. More specifically, the light-emitting element 24a is a red (R) LED, the light-emitting element 24b is a green (G) LED, and the light-emitting element 24c is a blue (B) LED.

The light guide case 28 of the line illuminator 16 is formed to have a U-shaped cross section. The rod-shaped light guide 26 is formed by injection-molding a transparent resin such as acryl. The cross section thereof is heptagonal. Light scattering patterns 30 for scattering light incident on the rod-shaped light guide 26 are formed by, for example, screen printing a bottom plane 26a of the rod-shaped light guide 26 with a while coating material, the bottom plane 26a facing the bottom plane of the light guide case 28 when the rod-shaped light guide 26 is loaded in the case 28.

The light scattering patterns 30 are formed such that the farther away from the light-emitting unit 24, the larger the area of the pattern. In the illustrated example, the light scattering patterns 30 are formed such that the farther away from the light-emitting unit 24, the larger the width of the pattern in the longitudinal direction. The light scattering patterns 30 may be formed such that the farther away from the light-emitting unit 24, the larger the width of the pattern in the lateral direction. What is essential is that, by ensuring that the farther away from the plane of incidence, the larger the area of the light scattering pattern 30, the light emitted by a light-emitting portion 32 is uniformly distributed over the entire length in the longitudinal direction (i.e., main scanning direction occurring when the illuminator is installed in the image reading device 10).

A light emitting portion 32 for emitting light outside is provided in the rod-shaped light guide 26 so as to be opposite to the bottom plane 26a. According to this embodiment, the light emitting portion 32 is formed as a first plane 32a and a second plane 32b connected to other. When the rod-shaped light guide 26 is loaded in the light guide case 28, the first plane 32a and the second plane 32b are exposed outside the light guide case 28.

Of the side planes of the rod-shaped light guide 26 extending in the longitudinal direction, the four side planes other than the bottom plane 26a, the first plane 32a, and the second plane 32b are covered by the light guide case 28 and function as reflecting surfaces that reflect the light scattered by the light scattering patterns 30 on the bottom plane 26a and cause the light emitting portion 32 to emit the light. Therefore, the first plane 32a and the second plane 32b forming the light emitting portion 32 emit the scattered light from the light scattering patterns 30 on the bottom plane 26a and the reflected light from the four side planes. Instead of loading the rod-shaped light guide 26 in the light guide case 28, the reflecting surfaces may be formed by coating the side planes of the rod-shaped light guide 26 with a reflective layer. In this case the step of loading the rod-shaped light guide 26 in the light guide case 28 is not necessary so that the cost is reduced.

The first plane 32a and the second plane 32b forming the light emitting portion 32 of the rod-shaped light guide 26 are formed as rectangular planes. One of the longer sides of the first plane 32a and one of the longer sides of the second plane 32b are connected to each other. The other longer sides of the first plane 32a and the other longer sides of the second plane 32b are connected to the respective adjacent side planes. In the illustrated example, a top part 32c in which the first plane 32a and the second plane 32b are connected is a straight peak without any curvature. Alternatively, the top part 32c may be chamfered or rounded. In this case, the top part 32c is prevented from being chopped.

In this embodiment, the first plane 32a and the second plane 32b are formed to have different areas. More specifically, the area of the first plane 32a is smaller than the area of the second plane 32b. The cross section of the light emitting portion 32 thus formed perpendicular to the longitudinal direction is asymmetrical. As shown in FIG. 1, the line illuminator 16 is fitted in the frame 12 such that the first plane 32a is located to face the document G and the second plane 32b is located to face the line image sensor 20.

Figure 4:
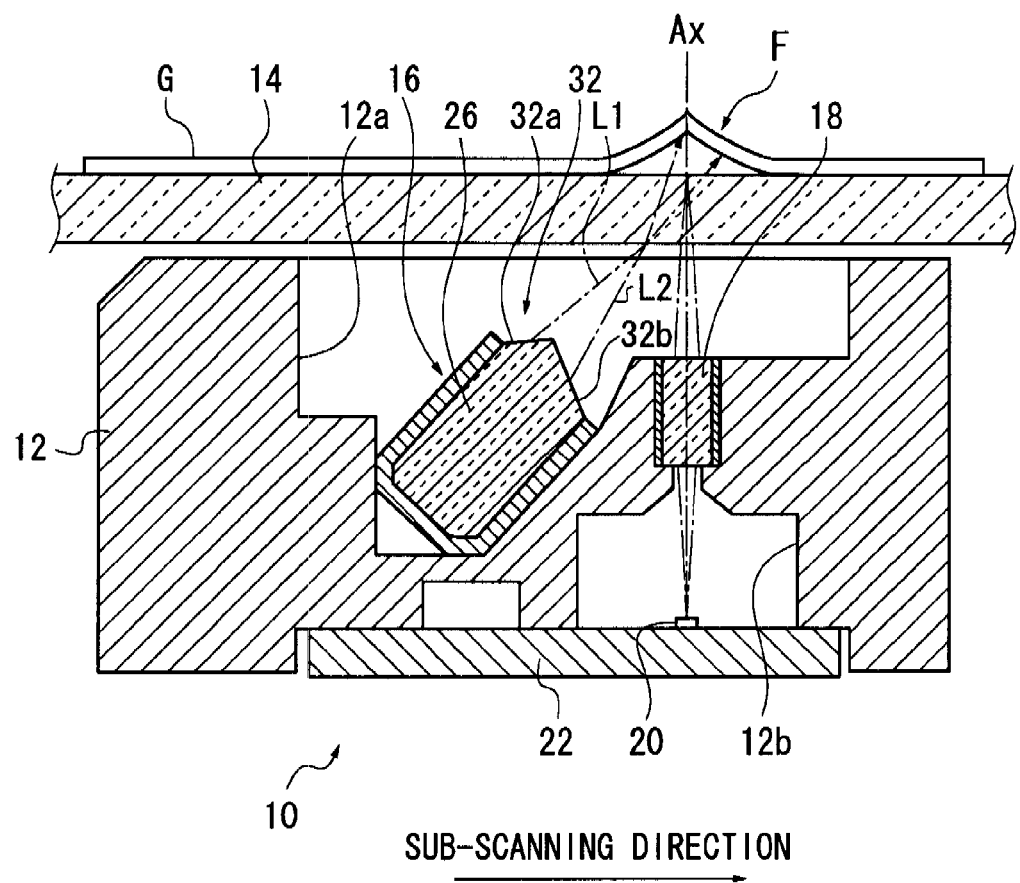
FIG. 4 shows how the light emitted by the line illuminator travels.

FIG. 4 shows how the light emitted by the line illuminator 16 travels. FIG. 4 shows that a portion of the document G is elevated from the glass plate 14 and how the elevated portion F is irradiated by light from the line illuminator 16. FIG. 4 shows that the most elevated portion is aligned with the optical axis Ax of the rod lens array 18.

FIG. 4 shows a beam L1 and a beam L2, L1 representing the light emitted from the first plane 32a and L2 representing the light emitted from the second plane 32b. FIG. 4 shows that the beam is emitted from a single point on the first plane 32a and the second plane 32b. Actually, beams are emitted from the entirety of the first plane 32a and the second plane 32b.

In this embodiment, the light emitting portion 32 of the rod-shaped light guide 26 is formed by the first plane 32a facing the document G and the second plane 32b facing the line image sensor 20. The first plane 32a is formed to be smaller than the second plane 32b so that the cross section of the light emitting portion 32 is asymmetrical. In this way, the first plane 32a distributes light such that the neighborhood of the intersection between the optical axis Ax of the rod lens array 18 and the top surface of the glass plate 14 is illuminated with intense light. The second plane 32b distributes light such that the elevated portion F aligned with the optical axis Ax of the rod lens array 18 is illuminated with intense light. By allowing the first plane 32a and the second plane 32b to distribute light as described above, the characteristic of illumination by the first plane 32a and that of the second plane 32b complement each other, resulting in a proper depth of illumination in which the document G is illuminated with intense light and the light intensity varies only slightly even if the elevation of the document G is increased.

Figure 5:
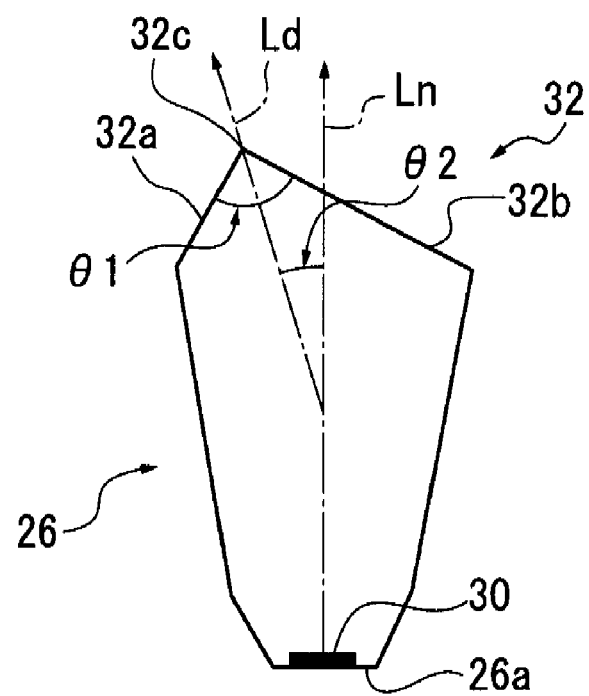
FIG. 5 shows a simulation model of the rod-shaped light guide.

A description will now be given of the suitable layout of the first plane 32a and the second plane 32b. FIG. 5 shows a simulation model of the rod-shaped light guide 26. As shown in FIG. 5, the interior angle formed by the first plane 32a and the second plane 32b will be indicated by θ1, the acute angle formed by the bisector Ld of the interior angle θ1 and the line Ln normal to the bottom plane 26a on which the light scattering patterns 30 are formed will be referred to as orientation θ2. The position of the top part 32c of the light emitting portion 32 is determined by the interior angle θ1 and the orientation θ2. That is, the shape of the light emitting portion 32 is determined by the interior angle θ1 and the orientation θ2.

Figure 6:
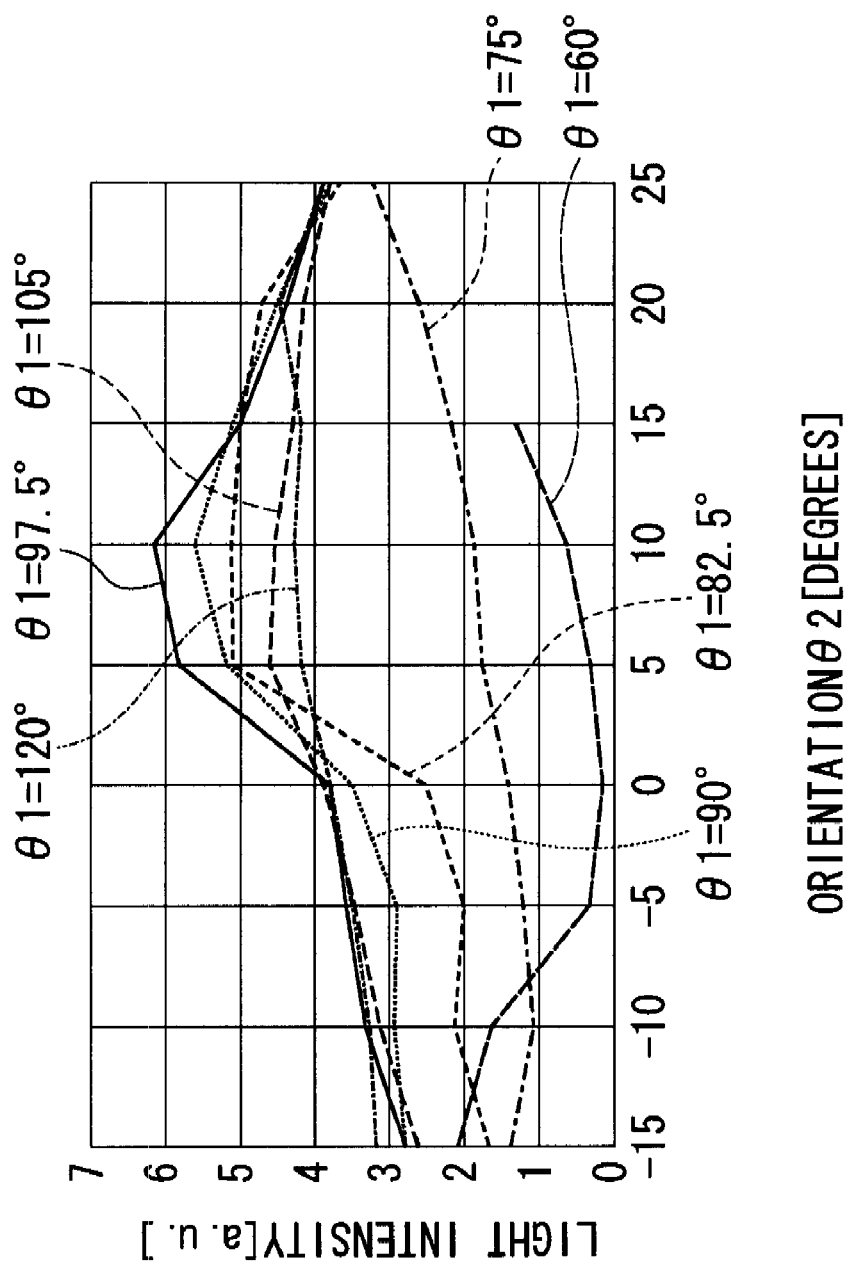
FIG. 6 is a graph showing a result of simulation measuring the relation between the orientation $\theta 2$ and the light intensity as the interior angle $\theta 1$ varies.

FIG. 6 is a graph showing a result of simulation measuring the relation between the orientation θ2 and the light intensity as the interior angle θ1 varies. The vertical axis of FIG. 6 represents the light intensity and the horizontal axis represents the orientation θ2. The light intensity is measured at the intersection between the optical axis Ax of the rod lens array 18 and the top surface of the glass plate 14. The simulation results for the interior angles θ1 of 60°, 75°, 82.5°, 90°, 97.5°, 105°, and 120° are plotted.

Assuming that the light intensity of 4 a.u. or greater provides sufficient brightness for the image sensor 20 to read the document, FIG. 6 shows that sufficient brightness can be obtained by setting the interior angle θ1 at 82.5-120° and setting the orientation θ2 at 2.5-20°.

Figure 7:
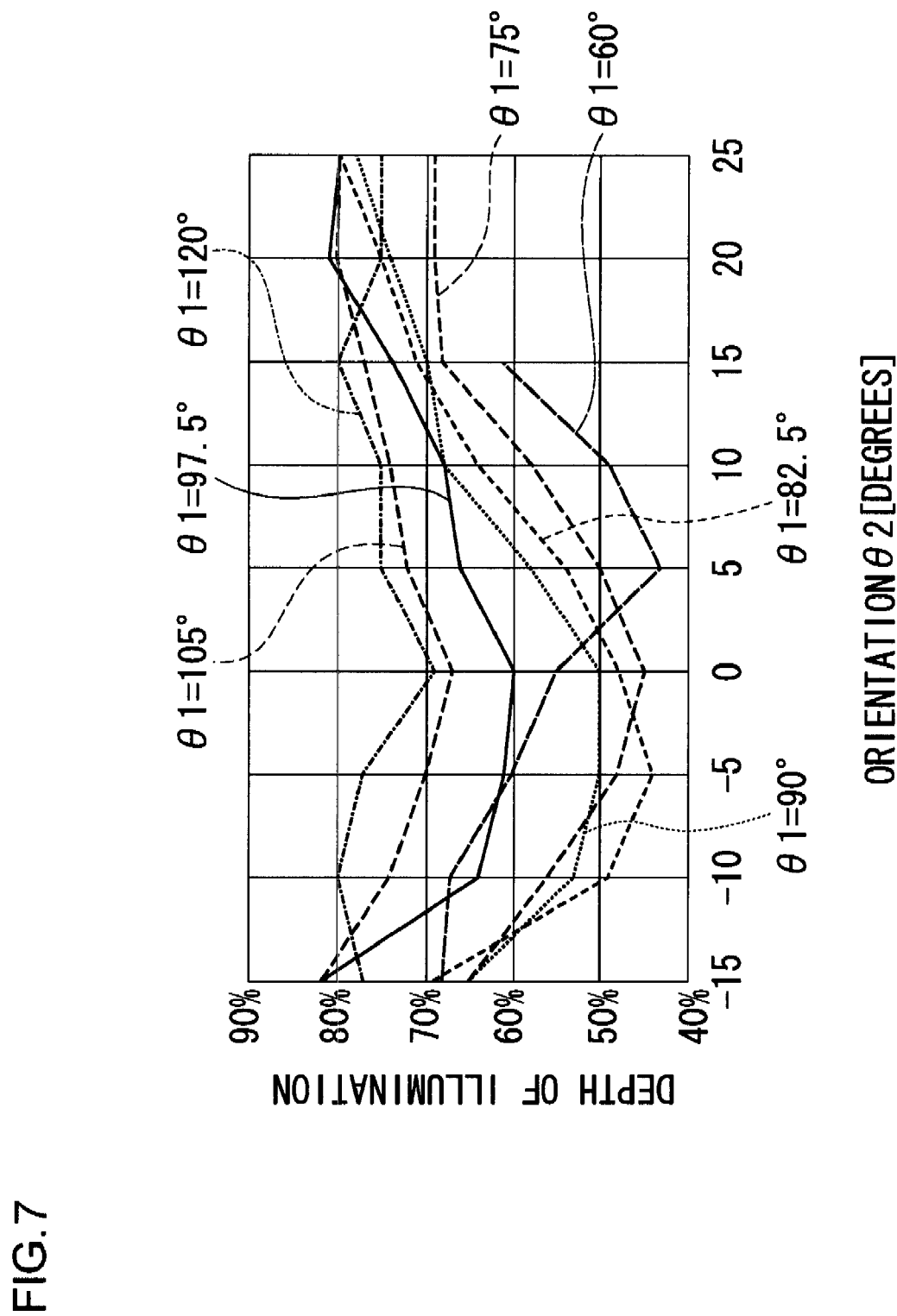
FIG. 7 is a graph showing a result of simulation measuring the relation between the orientation $\theta 2$ and the depth of illumination as the interior angle $\theta 1$ varies.

FIG. 7 is a graph showing a result of simulation measuring the relation between the orientation θ2 and the depth of illumination as the interior angle θ1 varies. The vertical axis of FIG. 7 represents a drop in the light intensity occurring when the document G is elevated from the glass plate 14 by 3 mm. For example, when the interior angle θ1 is set at 90° and the orientation θ2 is set at 0°, the document G is illuminated with light only 50% as bright as the light reaching the document G not elevated. As in FIG. 6, the simulation results for the interior angles θ1 of 60°, 75°, 82.5°, 90°, 97.5°, 105°, and 120° are plotted.

Assuming that the depth of illumination of 68% or greater is sufficient, sufficient depth of illumination can be obtained by setting the interior angle θ1 at 90-120° and setting the orientation θ2 at 10-25°. Thus, considering the graphs of FIGS. 6 and 7, high light intensity and proper depth of illumination can both be achieved by configuring the light emitting portion 32 such that the interior angle θ1 is 90-120° and the orientation θ2 is 10-20°.

In the embodiment described above, the two planes including the first plane 32a and the second plane 32b form the light emitting portion 32 of the rod-shaped light guide 26. Alternatively, the light emitting portion of the rod-shaped light guide may be formed by three or more planes. In this case, it is preferable that the first plane located at one end in the lateral direction is formed to be smaller in area that the second plane located at the other end so as to present an asymmetrical cross section of the light emitting portion. By forming the light emitting portion by a plurality of planes, the characteristic of illumination by a given plane can complement that of another so that high light intensity and proper depth of illumination can both be achieved.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. A rod-shaped light guide comprising:
a rod-shaped light guide body having a longitudinal axis, at least one end face orthogonal to said longitudinal axis and a plurality of peripheral side surfaces extending in a direction of said longitudinal axis;
said at least one end face comprising an end face to which light is incident;
a scattering pattern formation plane extending in a direction of said longitudinal axis and being operative to scatter light incident to the end face; and
a light emitting portion extending in a direction of said longitudinal axis and being located opposite to the scattering pattern formation plane for emitting light outside the guide, wherein
the light emitting portion comprises a plurality of said peripheral side surfaces formed as planes and comprising at least a first plane and a second plane connected to each other and a cross section of said light guide body perpendicular to the longitudinal axis is asymmetrical,
the light emitting portion is formed such that an area of said first plane is smaller than said second plane, and
the light emitting portion is formed such that an interior angle formed by the first plane and the second plane is between 90° and 120°.

2. A rod-shaped light guide comprising:
a rod-shaped light guide body having a longitudinal axis, at least one end face orthogonal to said longitudinal axis and a plurality of peripheral side surfaces extending in a direction of said longitudinal axis;
said at least one end face comprising an end face to which light is incident;
a scattering pattern formation plane extending in a direction of said longitudinal axis and being operative to scatter light incident to the end face; and
a light emitting portion extending in a direction of said longitudinal axis and being located opposite to the scattering pattern formation plane for emitting light outside the guide, wherein
the light emitting portion comprises a plurality of said peripheral side surfaces formed as planes and comprising at least a first plane and a second plane connected to each other and a cross section of said light guide body perpendicular to the longitudinal axis is asymmetrical,
the light emitting portion is formed such that an area of said first plane is smaller than said second plane, and
the light emitting portion is formed such that an acute angle formed by the bisector of an interior angle formed by the first plane and the second plane and a line normal to the scattering pattern formation plane is between 10° and 20°.

3. The rod-shaped light guide according to claim 1, wherein
the light emitting portion is formed such that the acute angle formed by the bisector of the interior angle formed by the first plane and the second plane and the line normal to the scattering pattern formation plane is between 10° and 20°.

4. An image reading device comprising:
the rod-shaped light guide according to claim 1 for illuminating a document with light;
a lens array operative to condense light emitted by the rod-shaped light guide and reflected by the document; and
a line image sensor operative to receive light condensed by the lens array, wherein
the rod-shaped light guide is fitted such that the first plane is located to face the document and the second plane is located to face the line image sensor.

5. An image reading device comprising:
the rod-shaped light guide according to claim 2 for illuminating a document with light;
a lens array operative to condense light emitted by the rod-shaped light guide and reflected by the document; and
a line image sensor operative to receive light condensed by the lens array, wherein
the rod-shaped light guide is fitted such that the first plane is located to face the document and the second plane is located to face the line image sensor.

* * * * *